US011831206B2

(12) United States Patent
Losey et al.

(10) Patent No.: US 11,831,206 B2
(45) Date of Patent: Nov. 28, 2023

(54) AXIAL-END HALBACH ARRAY CLADDING MAGNET MAGNETICALLY-GEARED MACHINE

(71) Applicant: Ohio State Innovation Foundation, Columbus, OH (US)

(72) Inventors: Bradley Losey, Columbus, OH (US); Marcelo Dapino, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 112 days.

(21) Appl. No.: 17/213,671

(22) Filed: Mar. 26, 2021

(65) Prior Publication Data

US 2021/0305862 A1 Sep. 30, 2021

Related U.S. Application Data

(60) Provisional application No. 63/000,706, filed on Mar. 27, 2020.

(51) Int. Cl.
*H02K 1/27* (2022.01)
*H02K 16/02* (2006.01)
*H02K 1/2792* (2022.01)
*H02K 29/03* (2006.01)
*H02K 3/28* (2006.01)

(52) U.S. Cl.
CPC ............ *H02K 1/2792* (2022.01); *H02K 3/28* (2013.01); *H02K 16/02* (2013.01); *H02K 29/03* (2013.01); *H02K 2213/03* (2013.01)

(58) Field of Classification Search
CPC ...... H02K 51/00; H02K 16/02; H02K 1/2783; H02K 1/2792; H02K 1/278; H02K 7/116; H02K 15/03; H02K 49/102; H02K 49/10-49/108
USPC .............................. 310/156.07, 156.37, 103
See application file for complete search history.

(56) References Cited

U.S. PATENT DOCUMENTS

| | | | |
|---|---|---|---|
| 2,243,555 A | 5/1941 | Faus | |
| 3,378,710 A | 4/1968 | Martin | |
| 8,446,060 B1* | 5/2013 | Lugg | F02C 3/113 310/156.22 |
| 2012/0262020 A1* | 10/2012 | Smith | H02K 21/12 29/596 |
| 2018/0269767 A1* | 9/2018 | Diehl | H02K 7/104 |
| 2022/0006340 A1* | 1/2022 | Hunstable | H02K 1/02 |

OTHER PUBLICATIONS

D. Zhu, F. Yang, Y. Du, F. Xiao, and Z. Ling, "An Axial-Field Flux-Modulated Magnetic Gear", IEEE Transactions on Applied Superconductivity, vol. 26, No. 4 (Jun. 2016). (Year: 2016).*

(Continued)

*Primary Examiner* — Thomas Truong
(74) *Attorney, Agent, or Firm* — Meunier Carlin & Curfman LLC

(57) ABSTRACT

An exemplary axial cladding magnet magnetically-geared machine is disclosed comprising Halbach array cladding magnets located on the axial ends of the magnetically-geared machine. The Halbach array cladding magnets can be used to increase the magnetic efficiency and torque transmission of the magnetically-geared machine by mitigating end-effect losses.

19 Claims, 11 Drawing Sheets

(56) References Cited

OTHER PUBLICATIONS

M. Johnson, M. Gardner, and H. Toliyat, "Design and Analysis of an Axial Flux Magnetically Geared Generator", 2015 IEEE Energy Conversion Congress and Exposition (ECCE) (Sep. 20-24, 2015). (Year: 2015).*

T. Tallerico, Z. Cameron, and J. Scheidler, "Design of a Magnetic Gear for NASA's Vertical Lift Quadrotor Concept Vehicle", AIAA Propulsion and Energy Forum, Indianapolis, IN (Aug. 19-22, 2019). (Year: 2019).*

M. J. Dapino, "Torque Analysis in Coaxial Magnetic Gears Considering Nonlinear Magnetic Properties and Spatial Harmonics," in IEEE Transactions on Magnetics, vol. 55, No. 2, pp. 1-11, Feb. 2019.

Gerber, S. and Wang, R.-J. (2014). "Analysis of the end-effects in magnetic gears and magnetically geared machines," Proceedings of ICEM 2014.

Salihu M.S., Misron, N., Mariun, N., Othman, M.L., and Hanamoto, T. (2016) "Torque Distribution Characteristics of a Novel Double-Stator Permanent Magnet Generator Integrated with a Magnetic Gear," Progress in Electromagnetics Research M, vol. 49, 69-80.

Paulo, V., Trevizoli, J.A.L., Guilherme F. P., and Jader R. B. J. (2015) "Design of nested Halbach cylinder arrays for magnetic refrigeration applications," Journal of Magnetism and Magnetic Materials, vol. 395, No. 1.

Fukuoka, M., Nakamura, K., and Ichinokura, O. (2012) "A Method for optimizing the design of SPM type magnetic gear based on reluctance network analysis," 2012 XXth International Conference on Electrical Machines, Sep. 2-5, 2012.

M. Johnson, M. C. Gardner, H. A. Toliyat, S. Englebretson, W. Ouyang and C. Tschida, "Design, construction, and analysis of a large scale inner stator radial flux magnetically geared generator for wave energy conversion," 2017 IEEE Energy Conversion Congress and Exposition, 2017, pp. 5017-5024.

Asnani, V., Scheidler, J., and Tallerico, T. (2018) "Magnetic Gearing Research at NASA," Presented at the AHS International 74th Annual Forum & Technology Display, Phoenix, Arizona, USA, May 14-17, 2018.

Jørgensen, F.T., Andersen, T.O., and Rasmussen, P.O. (2008) "The Cycloid Permanent Magnetic Gear," IEEE Transactions on Industry Applications, vol. 44, No. 6, pp. 1659-1665.

Gerber, S. (2015) "Evaluation and Design Aspects of Magnetic Gears and Magnetically Geared Electrical Machines," PhD Dissertation, 196 pages.

Silwal, B. (2018) "Computation of eddy currents in a solid rotor induction machine with 2-D and 3-D FEM," MS Thesis. 71 pages.

Abdel-Khalik, A.S., Ahmed, S., and Massoud, A. (2014) "A bearingless coaxial magnetic gearbox," Alexandria Engineering Journal, vol. 53, No. 3. pp. 573-582.

Hamler, A., Gorian, V., Šuštarši, B., and Sirc, A. (2006) "The use of soft magnetic composite materials in synchronous electric motor," Journal of Magnetism and Magnetic Materials, vol. 304, No. 2.

Funieru, B. and Binder, A. (2012) "Simulation of electrical machines end effects with reduced length 3D FEM models," XXth International Conference on Electrical Machines, Marseille, 2012, pp. 1430-1436.

Bjørk, R., Bahl, C.R.H., Smith, A., and Pryds, N. (2008) "Optimization and improvement of Halbach cylinder design," Journal of Applied Physics, vol. 104, No. 1.

K. Ikuta, S. Makita, and S. Arimoto, "Non-contact magnetic gear for micro transmission mechanism," in Proc. IEEE Micro Conf. Electro Mech. Syst., Nara, Japan, Jan. 1991, pp. 125-130.

J. Rens, R. Clark, S. Calverley, K. Atallah, and D. Howe, "Design, analysis and realization of a novel magnetic harmonic gear," in Proc. 18th Int. Conf. Elect. Mach. (ICEM), Sep. 2008, pp. 1-4.

S. Pakdelian, N. W. Frank, and H. A. Toliyat, "Principles of the transrotary magnetic gear," IEEE Trans. Mgn., vol. 49, No. 2, pp. 883-889, Feb. 2013.

S. Pakdelian, N. W. Frank, and H. A. Toliyat, "Magnetic design aspects of the trans-rotary magnetic gear," IEEE Trans. Energy Convers., vol. 30, No. 1, pp. 41-50, Mar. 2015.

K. Atallah and D. Howe, "A novel high-performance magnetic gear," IEEE Trans. Magn., vol. 37, No. 4, pp. 2844-2846, Jul. 2001.

G. Puchhammer, "Magnetic gearing versus conventional gearing in actuators for aerospace applications," in Proc. 42nd Aerosp. Mech. Symp., May 2014, pp. 175-182.

E. Gouda, S. Mezani, L. Baghli, and A. Rezzoug, "Comparative study between mechanical and magnetic planetary gears," IEEE Trans. Magn., vol. 47, No. 2, pp. 439-450, Feb. 2011.

K. Atallah, J. Wang, S. D. Calverley, and S. Duggan, "Design and operation of a magnetic continuously variable transmission," IEEE Trans. Ind. Appl., vol. 48, No. 4, pp. 1288-1295, Jul. 2012.

H. Shin and J. Chang, "Comparison of radial force at modulating pieces in coaxial magnetic gear and magnetic geared machine," IEEE Trans. Magn., vol. 54, No. 3, Mar. 2018.

K. Aiso, K. Akatsu, and Y. Aoyama, "A novel magnetic gear for high speed motor system," in Proc. IEEE Int. Elect. Mach. Drives Conf. (IEMDC), May 2017, pp. 1-7.

G. Jungmayr, J. Loeffler, B. Winter, F. Jeske, and W. Amrhein, "Magnetic gear: Radial force, cogging torque, skewing and optimization," in Proc. IEEE Energy Convers. Congr. Expo., Sep. 2015, pp. 898-905.

D. Žarko, D. Ban, and T. A. Lipo, "Analytical calculation of magnetic field distribution in the slotted air gap of a surface permanent-magnet motor using complex relative air-gap permeance," IEEE Trans. Magn., vol. 42, No. 7, pp. 1828-1837, Jul. 2006.

Z. Q. Zhu and D. Howe, "Instantaneous magnetic field distribution in brushless permanent magnet DC motors. III. Effect of stator slotting," IEEE Trans. Magn., vol. 29, No. 1, pp. 143-151, Jan. 1993.

K. Atallah, S. D. Calverley, and D. Howe, "Design, analysis and realisation of a high-performance magnetic gear," IEE Proc. Elect. Power Appl., vol. 151, No. 2, pp. 135-143, Mar. 2004.

L. Jian and K. T. Chau, "A coaxial magnetic gear with Halbach permanent-magnet arrays," IEEE Trans. Energy Convers., vol. 25, No. 2, pp. 319-328, Jun. 2010.

N. Niguchi and K. Hirata, "Cogging torque analysis of magnetic gear," IEEE Trans. Ind. Electron., vol. 59, No. 5, pp. 2189-2197, May 2012.

M. Fukuoka, K. Nakamura, and O. Ichinokura, "Dynamic analysis of planetary-type magnetic gear based on reluctance network analysis," IEEE Trans. Magn., vol. 47, No. 10, pp. 2414-2417, Oct. 2011.

M. Johnson, M. C. Gardner, and H. A. Toliyat, "A parameterized linear magnetic equivalent circuit for analysis and design of radial flux magnetic gears—Part I: Implementation," IEEE Trans. Energy Convers., vol. 33, No. 2, pp. 784-791, Jun. 2018.

M. Desvaux, B. Traullé, R. L. G. Latimier, S. Sire, B. Multon, and H. B. Ahmed, "Computation time analysis of the magnetic gear analytical model," IEEE Trans. Magn., vol. 53, No. 5, May 2017.

Y.-J. Ge, C.-Y. Nie, and Q. Xin, "A three dimensional analytical calculation of the air-gap magnetic field and torque of coaxial magnetic gears," Prog. Electromagn. Res., vol. 131, pp. 391-407, Jan. 2012.

P. O. Rasmussen, T. O. Andersen, F. T. Joergensen, and O. Nielsen, ,"Development of a high performance magnetic gear," in Proc. 38th IAS Annu. Meeting Conf. Rec. Ind. Appl. Conf., vol. 3, Oct. 2003, pp. 1696-1702.

L. Jian, K. T. Chau, Y. Gong, J. Z. Jiang, C. Yu, and W. Li, "Comparison of coaxial magnetic gears with different topologies," IEEE Trans. Magn., vol. 45, No. 10, pp. 4526-4529, Oct. 2009.

Y. B. Li, S. Niu, S. L. Ho, Y. Li, and W. N. Fu, "Hysteresis effects of laminated steel materials on detent torque in permanent magnet motors," IEEE Trans. Magn., vol. 47, No. 10, pp. 3594-3597, Oct. 2011.

M. Filippini, P. Alotto, G. Glehn, and K. Hameyer, "Magnetic transmission gear finite element simulation with iron pole hysteresis," Open Phys., vol. 16, No. 1, pp. 105-110, 2018.

D. C. Jiles and D. L. Atherton, "Theory of ferromagnetic hysteresis," J. Magn. Magn. Mater., vol. 61, Nos. 1-2, pp. 48-60, Sep. 1986.

(56) References Cited

OTHER PUBLICATIONS

D. K. Rao. (Mar. 8, 2018). MagWeb User Manual. [Online]. Available: https://magweb-website-magwebusa.netdna-ssl.com/wp-content/uploads/2018/03/User-Manual-Version-4.pdf.
Magnetics, Division of Spang & Co. (May 8, 2018). Supermalloy Material Property Curves. [Online]. Available: https://www.mag-inc.com/Products/Tape-Wound-Cores/Supermalloy/Supermalloy-Material-Property-Curves.
Ohio Supercomputer Center. 1987. [Online]. Available: http://osc.edu/ark:/19495/f5s1ph73.

* cited by examiner

AXIAL-END HALBACH ARRAY CLADDING MAGNET MAGNETICALLY-GEARED MACHINE

RELATED APPLICATION

This application claims priority to, and the benefit of, U.S. Provisional Patent Application No. 63/300,706, filed Mar. 27, 2020, entitled "Axial Cladding Magnet Magnetically-Geared Machine," which is incorporated by reference herein in its entirety.

GOVERNMENT LICENSE RIGHTS

This invention was made with government support under grant number 1738723 awarded by the National Science Foundation. The government has certain rights in the invention.

BACKGROUND

Magnetic gears (MGs) that transmit torque and motion via magnetic coupling can provide low maintenance cost and low noise to electrical drives. Compared with mechanical gears, MGs offer a simpler design, in that they do not require seals or component lubrication nor overload protection mechanisms or clutches.

The coaxial MG (CMG) can provide a maximum torque density with large gear ratios (e.g., up to 21:1). A typical CMG may include an inner ring with magnet pole pairs, an outer ring with magnet pole pairs, and a magnetic flux modulator with pole pieces. The inner ring magnets or structure may be connected to a high-speed input shaft. The low-speed output shaft can be connected to the flux modulator or the outer ring magnets or structure. End-effect losses can contribute to the overall inefficiency of a coaxial magnetic gear or machine.

There is a benefit to reducing end-effect losses in various magnetic gear systems such as coaxial magnetic gears.

SUMMARY

An exemplary axial-cladding-magnet magnetically-geared machine is disclosed comprising Halbach array cladding magnets located on the axial ends of the magnetically-geared machine. The Halbach array cladding magnets can be used to increase the overall magnetic efficiency and torque transmission of the magnetically-geared machine by mitigating end-effect losses.

Examples of magnetically geared machines include magnetic gears and magnetic motors. Magnetic gears are devices which exploit modulation of rotor magnetic field harmonics to perform gearing operations. That is, a magnetic outer rotor, magnetic inner rotor, and flux modulator of the machine can operate in tandem to decrease/increase the speed of a shaft while increasing or decreasing the torque of the shaft using only bearing contacts between non-zero relative velocity parts.

Halbach array cladding magnets are, in some embodiments, permanent magnetic materials that have a magnetization vector with a non-zero axial component. In the exemplary magnetic gear system, the Halbach array cladding magnets are positioned on the axial ends of the magnetic gear system to mitigate end-effect losses and increase overall magnetic efficiency and torque. The permanent magnets of the Halbach array cladding magnets are arranged to focus magnetic flux towards one side of the array. The exemplary magnetic gear system facilitates an efficient use of the cladding magnet volume to contain end effects, which can contribute to 65%-80% of losses for most standard machine designs. From simulations, a magnetic gear system configured with axial-end Halbach array cladding magnets was observed to have a 12% increase in specific torque output, e.g., for a machine design of the same or similar size or weight.

In an aspect, a magnetically geared machine is disclosed configured as a magnetic gear or magnetically geared motor comprising a magnetic outer rotor, a magnetic inner rotor, and a flux modulator, the magnetically geared machine further comprising Halbach array cladding magnets disposed at each axial end of the magnetically geared machine.

In some embodiments, the Halbach array cladding magnets comprise permanent magnetic materials that have a magnetization vector with a non-zero axial component.

In some embodiments, the axially-oriented Halbach arrays are disposed over each rotor pole to cap magnetic flux at the ends of the electric machine.

In some embodiments, the axially-oriented Halbach arrays include a plurality of axially directed magnets each positioned over a pole of the magnetic inner rotor and magnetic outer rotor.

In some embodiments, the magnetically geared machine of claim 1, wherein the magnetic outer rotor, the magnetic inner rotor are configured as a first Halbach array configuration, and wherein the Halbach array cladding magnets are configured as a second Halbach array configuration, wherein each of the magnets of the second Halbach array configuration forms a tilt angle between about 40° and about 50° to corresponding magnets of first Halbach array configuration.

In some embodiments, the tilt angle is about 45°. In some embodiments, the tilt angle is at least one of about 40°, 41°, 42°, 43°, 44°, 45°, 46°, 47°, 48°, 49°, and 50°, wherein the about refers to about ±0.5°.

In some embodiments, the magnetically geared machine is configured as a small-aspect ratio electric machine.

In some embodiments, the magnetically geared machine is configured as a co-axial magnetic gear.

In some embodiments, the magnetically geared machine is configured as a magnetic gear.

In some embodiments, a percentage of inner/outer rotor magnet height (non-cladding) covered by the cladding magnet in the radial direction is at least 50%.

In another aspect, a spacecraft is disclosed comprising any of the above-noted magnetically geared machine. As used herein, the term "spacecraft" refers to any vehicle or machine designed to fly in outer space or upper stratosphere.

In another aspect, an aircraft, or like vehicle (e.g., rotorcraft), is disclosed comprising any of the above-noted magnetically geared machine. As used herein, the term "aircraft" refers to any machine capable of flight including fixed-wing aircrafts, helicopters, rotorcraft, and drones.

In another aspect, a wind turbine is disclosed comprising any of the above-noted magnetically geared machine.

In another aspect, a vehicle is disclosed comprising any of the above-noted magnetically geared machine. As used herein, the term "vehicle" refers to electric or non-electric vehicle is a vehicle that uses one or more electric motors or traction motors for propulsion, generators, or pumps.

BRIEF DESCRIPTION OF THE DRAWINGS

The accompanying drawings, which are incorporated in and constitute a part of this specification, illustrate embodiments and together with the description, serve to explain the principles of the methods and systems.

Embodiments of the present invention may be better understood from the following detailed description when read in conjunction with the accompanying drawings. Such embodiments, which are for illustrative purposes only, depict novel and non-obvious aspects of the invention. The drawings include the following figures.

DETAILED SPECIFICATION

Example System and Method

An exemplary axial-cladding-magnet magnetically-geared machine is disclosed comprising cladding magnets on the axial ends of the magnetically-geared machine. In some embodiments, the magnetically-geared machine includes Halbach array cladding magnets on its axial ends. The cladding magnets (e.g., Halbach array cladding magnets) can be used to increase the overall magnetic efficiency and torque transmission of the magnetically-geared machine by mitigating end-effect losses.

Figure 1:
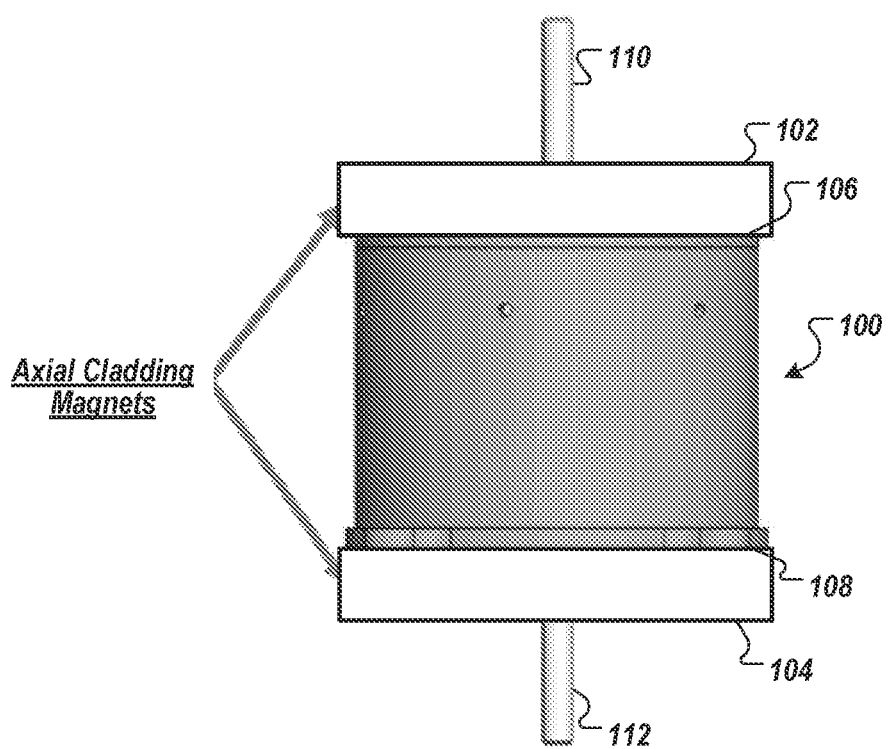
FIG. 1 shows an exemplary magnetic gear system configured with axial-end Halbach array cladding magnets on the axial ends of the magnetic gear system in accordance with an illustrative embodiment.

FIG. 1 shows an exemplary magnetic gear system 100 configured with axial-end Halbach array cladding magnets 102, 104 on the axial ends 106, 108 of the magnetic gear system 100 in accordance with an illustrative embodiment. The axial-end Halbach array cladding magnets 102, 104 are fixably attached to the radial magnet rotors of the magnetic gear system to mitigate end-effect losses.

Figure 2A:
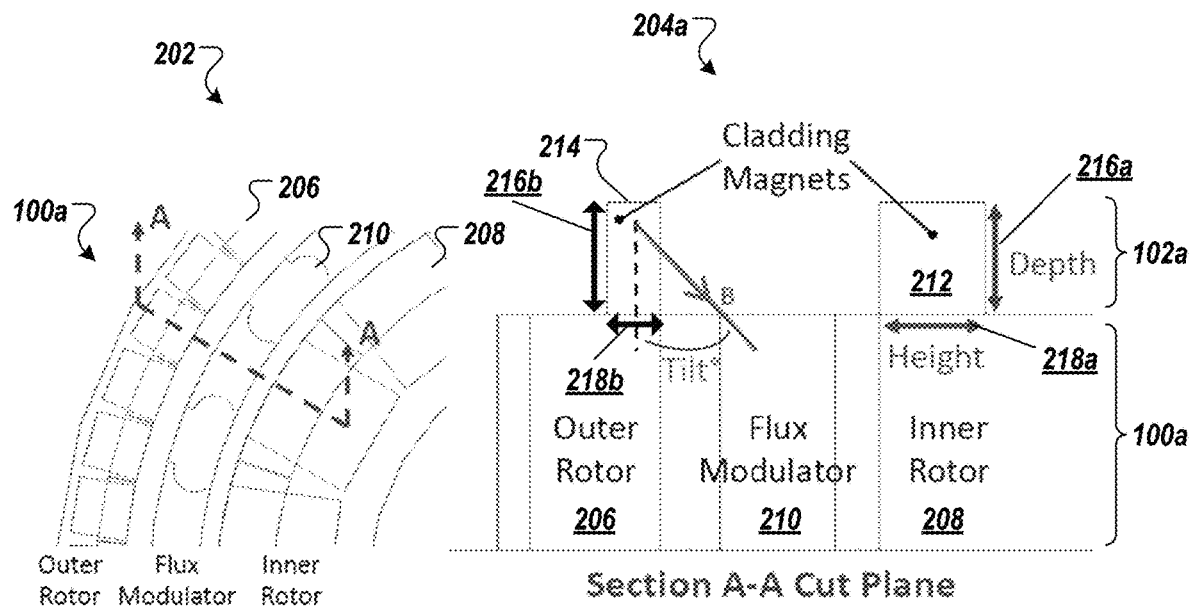
FIGS. 2A, 2B, and 2C each shows an example of axial-end Halbach array cladding magnets for a magnetic gear system in accordance with an illustrative embodiment.
Figure 2A:
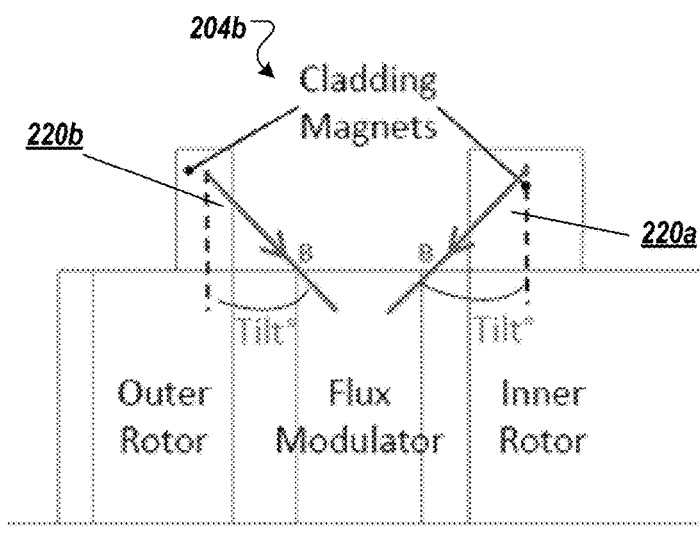
Figure 2B:
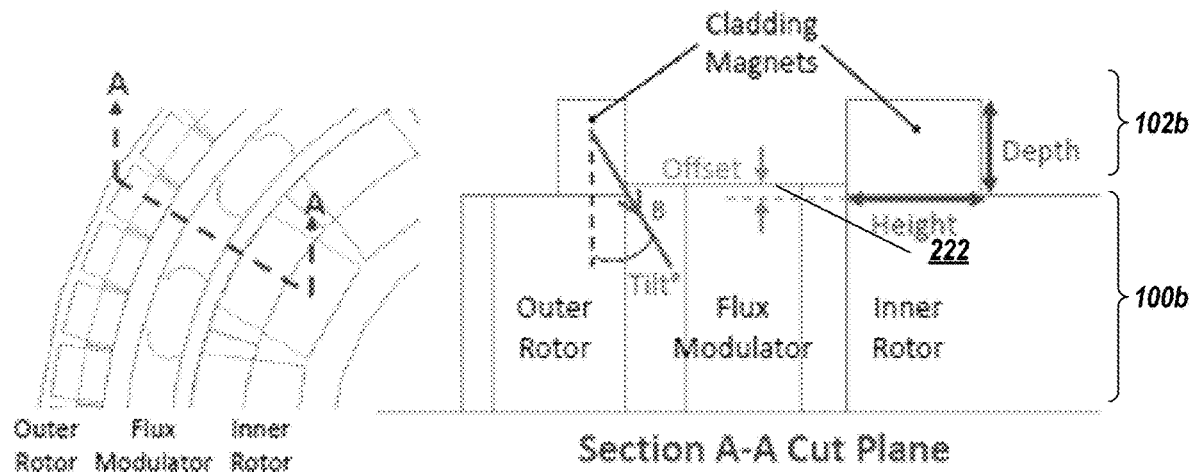
Figure 2C:
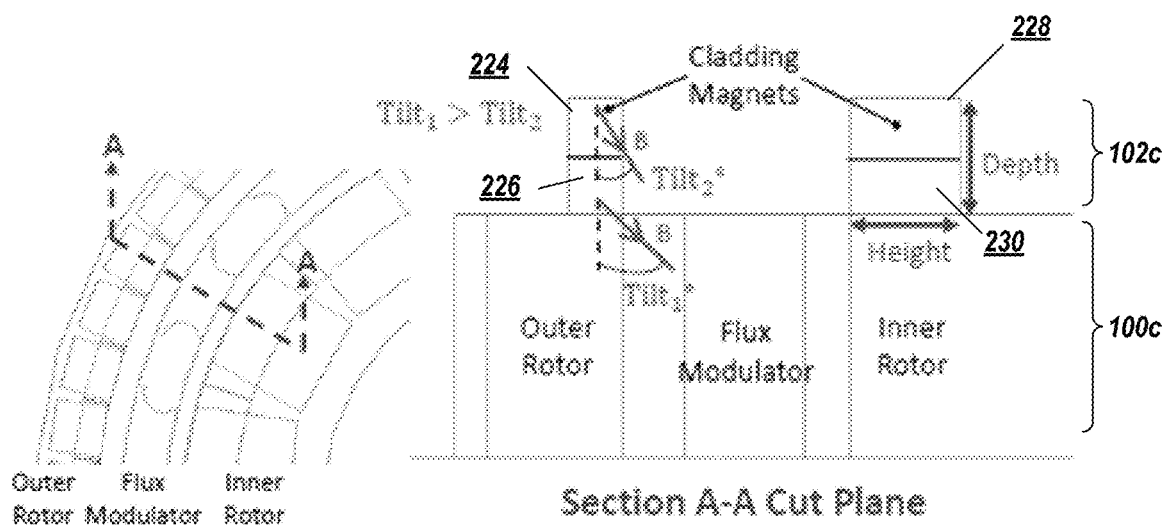

FIGS. 2A, 2B, and 2C each shows an example of axial-end Halbach array cladding magnets 102 (shown as 102a, 102b, 102c) for a magnetic gear system (e.g., 100) in accordance with an illustrative embodiment. In each of FIGS. 2A, 2B, and 2C, a radial view 202 (shown in FIG. 2A) of an exemplary magnetic gear system 100 (shown as 100a, 100b, 100c) is shown along with a lateral cross-sectional profile (shown as 204a, 204b in FIG. 2A) of a respective exemplary axial-end Halbach array cladding magnet configuration 102a.

Gear Machine and Cladding Magnet Example #1

Figure 3:
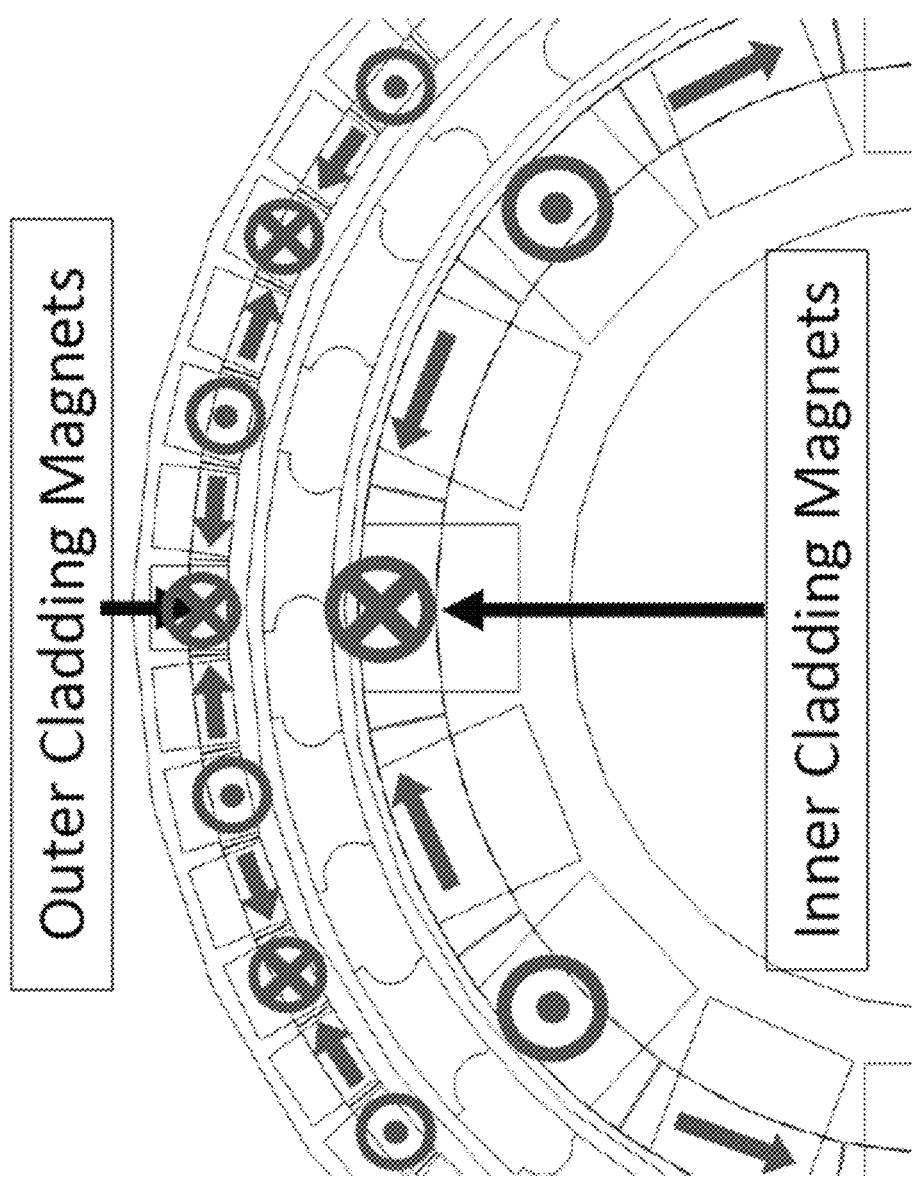
FIG. 3 shows an example configuration of the first set of axial-end Halbach array cladding magnets, in accordance with an illustrative embodiment.

In FIG. 2A, the exemplary magnetic gear system 100a includes a magnetic outer rotor 206 (shown as "Outer Rotor" 206), a magnetic inner rotor 208 (shown as "Inner Rotor" 208), and a flux modulator 210. The magnetic outer rotor 206 and the magnetic inner rotor 208 are configured as a first set of Halbach arrays and can operate in tandem to decrease/increase the speed, torque, etc., of a shaft 110 (not shown, see FIG. 1) from an input shaft 112. The exemplary magnetic gear system 100a may beneficially include only bearing contact between the parts of non-zero relative velocities. FIG. 3 shows an example configuration of the first set of axial-end Halbach array cladding magnets, in accordance with an illustrative embodiment.

In FIG. 2A, the axial-end Halbach array cladding magnets 102 (shown comprising "Cladding Magnets" 212, 214) are coupled to the radial magnets (e.g., 206, 208) or are positioned with no or minimum air gaps to minimize, or provide reduced, reluctance between itself and the flux modulator 210. Each of the axial-end Halbach array cladding magnets 102 may be configured with a depth 216 (shown as 216a, 216b), height 218 (shown as 218a, 218b), and tilt position 220 (shown as 220a, 220b). The height, depth, and tilt position may be specified differently for each of the axial-end Halbach array cladding magnets 212, 214. A similar or same axial-end Halbach array cladding magnet configuration may be coupled or position at the other axial end 108 of the magnetic gear system (e.g., 100, 100a). The axial-end Halbach array cladding magnets 102 are configured to concentrate flux towards an axial center (e.g., concentric with the shaft 110 or 112) of the gear system (e.g., 100). The axial-end Halbach array cladding magnets 102 preferably form a tilt angle between about 40° and about 50° to the flux modulator 210 of the gear system (e.g., 100a). It should be appreciated that the shafts 110 and 112 of the gear system may be concentric or non-concentric as well as parallel or non-parallel to one another.

The axial-end Halbach array cladding magnets 102 may be incorporated to the magnetic gear system (e.g., 100) to increase performance without increasing the overall size, in some embodiments, or increasing the mass of the total end system, in other embodiments. To this end, in some embodiments, the additional mass and length of the axial-end Halbach array cladding magnets 102 can offset the reduced axial length and mass of the components of the base magnetic gear system. Indeed, when applied to the same magnetic gear system, the axial-end Halbach array cladding magnets 102 can improve the torque per unit mass (specific torque) output of that system.

To show the benefit of the axial-end Halbach array cladding magnets 102, an exemplary magnetic gear system configured with axial-end Halbach array cladding magnets is compared to a base magnetic gear system in which the modified system is configured with a same size and weight as the base magnetic gear system. Torque is known to increase as mass increases (assuming magnetically active mass is increased). Specific torque increasing with respect to mass means that it would be inappropriate to compare the specific torque of more massive CM-CMGs to less massive CMGs because it would advantage the larger CM-CMGs. Without axial adjustment, the CM-CMG is always more massive than the corresponding CMG because of the additional cladding magnet mass.

Figure 4:
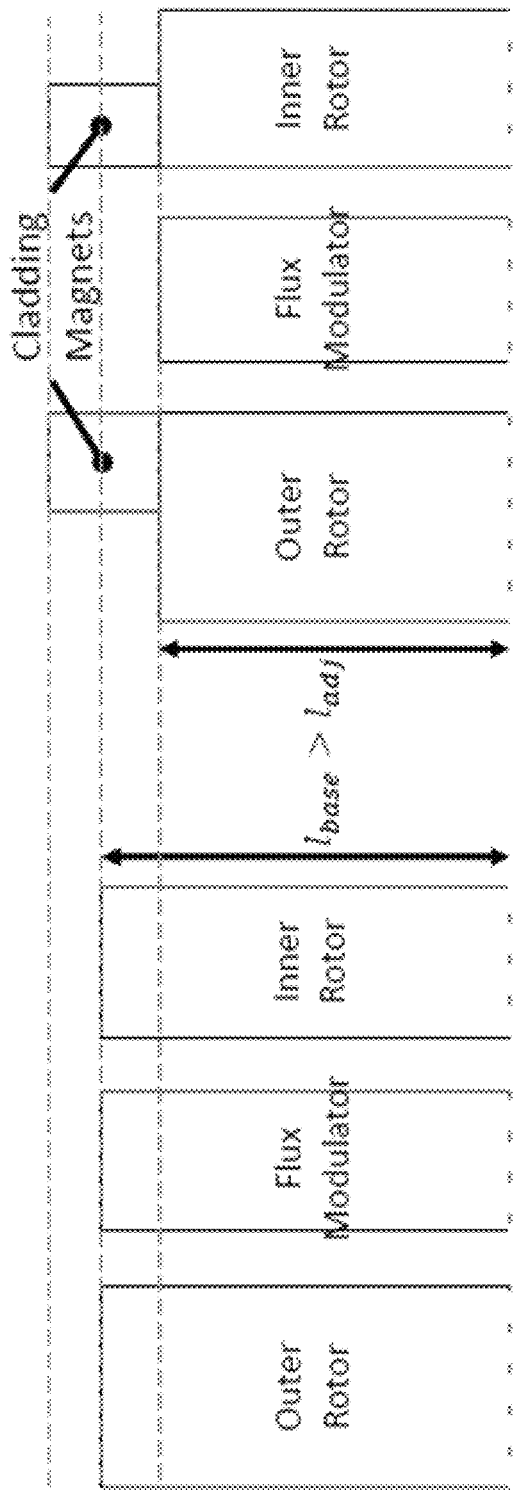
FIG. 4 shows comparable views of an example comparison of the axial length of a magnetic gear system and a comparable magnetic gear system coupled with the axial-end Halbach array cladding magnets.

FIG. 4 shows comparable views of an example comparison of the axial length of a magnetic gear system and a comparable magnetic gear system coupled with the axial-end Halbach array cladding magnets. The weight for an exemplary magnetic gear system coupled with the axial-end Halbach array cladding magnets may be defined by Equation 1.

$$W_{base} = W_{adj} + W_{CM} \qquad \text{(Equation 1)}$$

In Equation 1, $W_{base}$ is the base weight of base gear system, $W_{adj}$ is the weight of the adjusted standard gear portion, and $W_{CM}$ is the weight of the cladding weight. The length of the exemplary magnetic gear system may be defined by Equation 2.

$$l_{adj} = l_{base} - \frac{W_{CM}}{\lambda_{gear}} \qquad \text{(Equation 2)}$$

In Equation 2, $I_{adj}$ is the adjusted axial length of the standard gear portion, $I_{base}$ is the base length of PT-1, and $\lambda_{gear}$ is the mass per unit axial length of the PT-1 cross-section.

The axial-end Halbach array cladding magnets may have configuration that is specified by height (e.g., 218a, 218b), depth (e.g., 216a, 216b), and tilt orientation (e.g., 220a, 220b).

Height Parameter for Halbach Array. Cladding magnet height (e.g., 218a, 218b) refers to the radial length of the cladding magnet, e.g, as shown in FIG. 2. The inner and outer rotor radial magnets located underneath the cladding magnets may have different thicknesses, in some embodiments, a height ratio $H_{ratio}$ can be used to scale the inner and outer cladding magnets to cover a set percentage of their respective radial magnets. The $H_{ratio}$ may be defined as Equation 3.

$$H_{ratio} = \frac{H_{in}}{t_{IR}} = \frac{H_{out}}{t_{OR}} \qquad \text{(Equation 3)}$$

In Equation 3, $H_{in}$ is the height of the inner cladding magnets, $t_{IR}$ is the thickness of the inner rotor magnets, $H_{out}$ is the height of the outer cladding magnets, and $t_{OR}$ is the thickness of the outer rotor magnets.

Figure 5A:
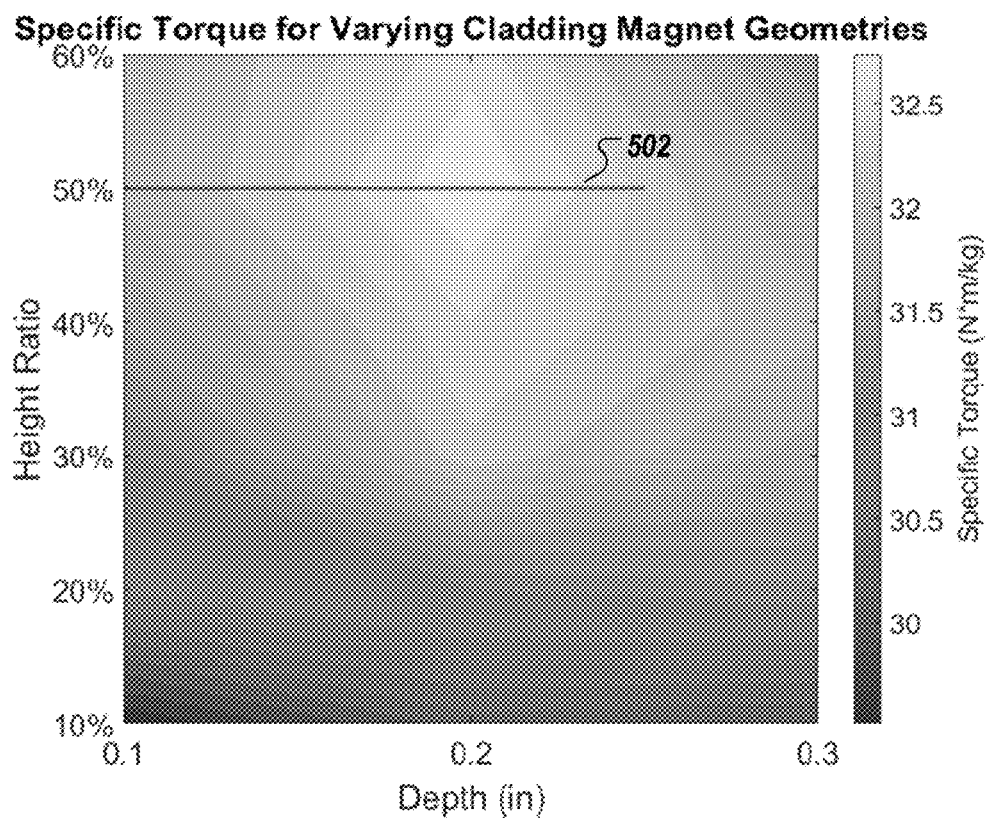
FIGS. 5A and 5B shows specific torque for different axial-end Halbach array cladding magnets geometries in accordance with an illustrative embodiment.
Figure 5B:
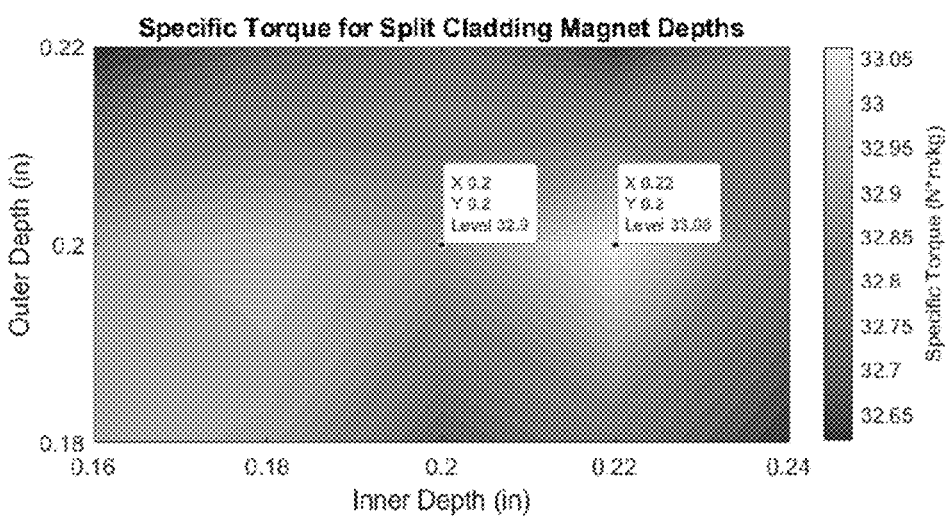

FIGS. 5A and 5B show specific torque for different axial-end Halbach array cladding magnets cladding magnetic geometries in accordance with an illustrative embodiment. Specifically, FIG. 5A shows specific torque for different cladding magnetic geometries, including for different values of height ratio and depth. As shown in FIG. 5A, for nearly all depths, the maximum specific torque appears at a height ratio of 50%. The trend is highlighted on the contour by a line 502, which shows the maximum specific torque at a height ratio of 50% and a depth of 0.2" (5.08 mm). A 50% height factor generally ensures a fully covered north and south pole adjacent to the air gap, though does not apply indefinitely as depth increases, particularly where the depth is beyond optimal range (e.g., more than 25% greater than optimal depth).

Depth Parameter for Halbach Array. FIG. 2 shows the depth (e.g., 216a, 216b) of the axial length of the cladding magnet. FIG. 5B shows specific torque as inner and outer cladding magnet depths 216a, 216b are varied. FIG. 5B appears to suggest that decoupling the inner and outer cladding magnet depth has an insignificant impact on the specific torque, and the maximum specific torque appears to occur at an inner depth of 0.22" (5.59 mm) and an outer depth of 0.2" (5.08 mm) for this example design. Indeed, the depth of optimal specific torque slightly increases as base axial length of the CMG increases. The correlation can help estimate a range of depths to include in a parametric sweep of a given design, particularly since as specific torque increases, the base axial length is increased, and the gear becomes more massive. To provide for more systematic comparison on torque performance between designs, the models should be compared for the same mass.

Tilt Parameter for Halbach Array. FIG. 2 shows the tilt geometry (e.g., 220a, 220b) of the configuration of the axial-end Halbach array cladding magnets 102, 104. Tilt refers to the rotation of the cladding magnet magnetization vector about the tangential axis. Tilt between each rotor can be mirrored about the flux modulator such that when tilt is greater than 0° and less than 90°, both sets of cladding magnets are oriented towards the flux modulator.

Tilt only needs to be applied to the cladding magnets with a non-zero radial or axial remanent flux density component because the purely tangential cladding magnets which makeup the Halbach array experience no change in vectoring when rotated around the tangential axis. The tilt is applied to these cladding magnets of non-zero radial or axial remanent flux density on the inner rotor by Equation 4 and on the outer rotor by Equation 5.

$$\vec{B}_{r,tilt} = \vec{B}_r \times \begin{bmatrix} \cos(\text{Tilt}) & 0 & \sin(\text{Tilt}) \\ 0 & 1 & 0 \\ -\sin(\text{Tilt}) & 0 & \cos(\text{Tile}) \end{bmatrix} \qquad \text{(Equation 4)}$$

$$\vec{B}_{r,tilt} = \vec{B}_r \times \begin{bmatrix} \cos(-\text{Tilt}) & 0 & \sin(-\text{Tilt}) \\ 0 & 1 & 0 \\ -\sin(-\text{Tilt}) & 0 & \cos(-\text{Tile}) \end{bmatrix} \qquad \text{(Equation 5)}$$

In Equations 4 and 5, $\vec{B}_{r,tilt}$ is the remanent flux density vector after tilt is applied, $\vec{B}_r$ is the original remanent flux density vector, and Tilt refers the tilt (220a, 220b). All vectors in the equations are defined in cylindrical coordinates.

Figure 6:
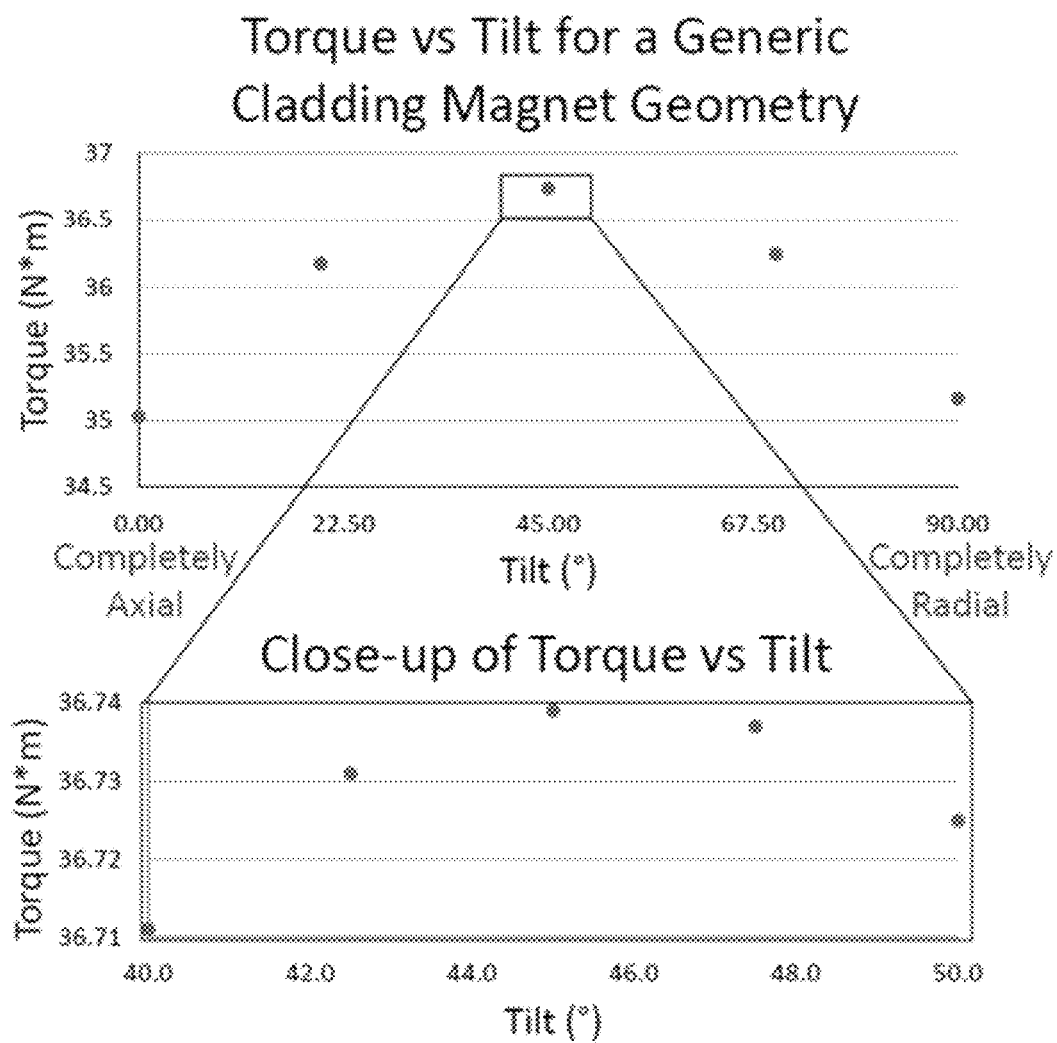
FIG. 6 shows results of a study conducted, using experimentally-calibrated computer models, to assess the sensitivity of output torque to tilt of an axial-end Halbach array cladding magnets gear machine in accordance with an illustrative embodiment.

FIG. 6 shows results of a study conducted, using simulation, to assess the sensitivity of output torque to tilt of an axial-end Halbach array cladding magnets gear machine in accordance with an illustrative embodiment. In FIG. 6, torque is shown to be improved by 4.88% if tilt is set to 45° as opposed to completely axial at 0°. Another feature of tilt behavior shown by FIG. 6 is that torque is not particularly sensitive to tilt around 45°. From a tilt of 40° to 50°, torque only varies by 0.03 N*m.

The study also evaluated the sensitivity of tilt parameters for the inner and outer cladding magnets. Table 1 shows the results of this second sensitivity study.

TABLE 1

| Trial | $\text{Tilt}_{in}(°)$ | $\text{Tilt}_{out}(°)$ | Output Torque (N * m) |
|---|---|---|---|
| 1 | 42.5 | 47.5 | 37.3 |
| 2 | 45.0 | 47.5 | 37.3 |
| 3 | 47.5 | 47.5 | 37.3 |

TABLE 1-continued

| Trial | Tilt$_{in}$(°) | Tilt$_{out}$(°) | Output Torque (N * m) |
|---|---|---|---|
| 4 | 50.0 | 47.5 | 37.3 |
| 5 | 52.5 | 47.5 | 37.3 |

As shown in Table 1, it is observed that sweeping Tilt$_{in}$ does not affect the resulting torque. The study concluded that optimal tilt falls around 45° though variation around this optimum configuration minimally affects torque.

Gear Machine and Cladding Magnet Example #2

FIG. 2B shows another example of axial-end Halbach array cladding magnets 102 (shown as 102b) for a magnetic gear system 100 (shown as 100b) in accordance with an illustrative embodiment. In FIG. 2B, the magnetic gear system 100b is configured with an offset 222 that partially extends to the region of the axial-end Halbach array cladding magnets 102b to overlap in part with it. Offset 222 can also be referred to as the difference in axial length between the flux modulator and the magnet rotors.

In a study, a model was simulated with an offset of 0.02" (0.508 mm). Axial lengths of the flux modulator and magnet rotors were adjusted to keep mass constant as compared to a base system with no offset. From the study, it was observed that baseline model can produce a specific torque of 33.01 N*m/kg while the offset model produces a specific torque of 32.76 N*m/kg.

Gear Machine and Cladding Magnet Example #3

FIG. 2C shows another example of axial-end Halbach array cladding magnets 102 (shown as 102c) for a magnetic gear system 100 (shown as 100c) in accordance with an illustrative embodiment. In FIG. 2C, the axial-end Halbach array cladding magnets 102c is configured with 2 sets of magnets (224, 226, 228, 230).

Specifically, in FIG. 2C, the cladding magnets are arranged in an upper and lower cladding magnet configuration with their own respective distinct magnetization vectors. To minimize reluctance between the flux modulator and each of the two cladding magnets, the tilt parameter of the lower magnet 226 (Tilt1) is set to be greater than the tilt 224 of the upper magnet (Tilt2). Table 2 shows results, using simulation, of sensitivity of the specific torque output based on the tilt parameters.

TABLE 2

| Trial | Tilt$_1$(°) | Tilt$_2$(°) | Specific Torque (N * m/kg) |
|---|---|---|---|
| Baseline | 45 | 45 | 33.0 |
| 1 | 60 | 30 | 33.0 |
| 2 | 50 | 40 | 33.1 |

It can be observed in Table 2, that the tilt parameter can minimally improve specific torque output over the base design.

Cladding Magnet Example #1

Figure 7A:
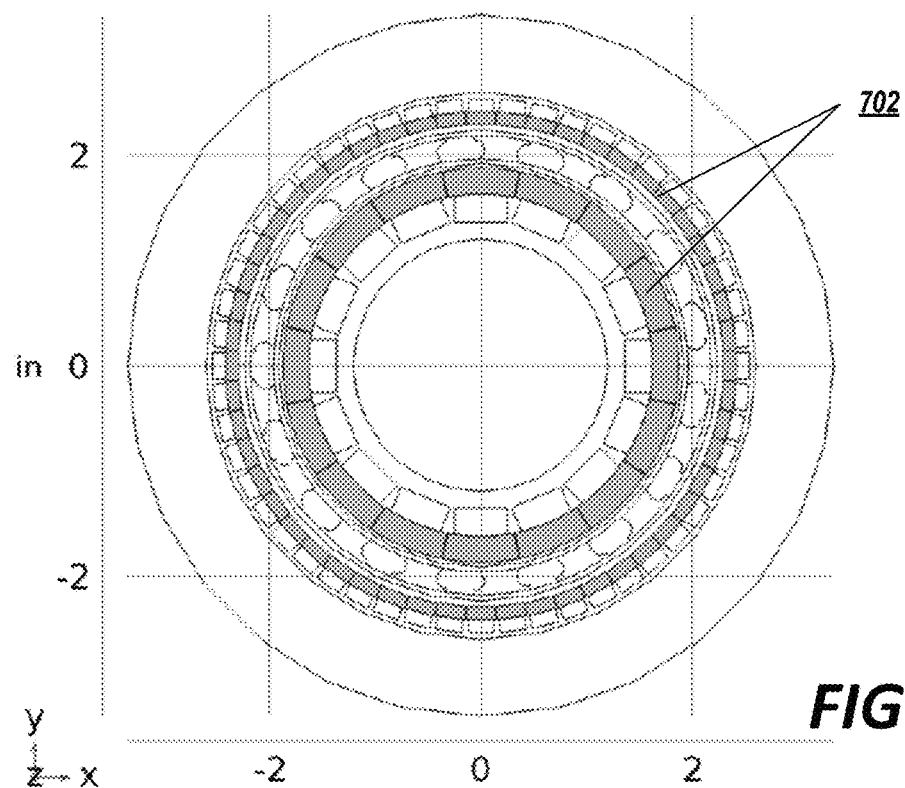
FIGS. 7A and 7B show an example gear machine system configured with Halbach array cladding magnets in accordance with an illustrative embodiment.
Figure 7B:
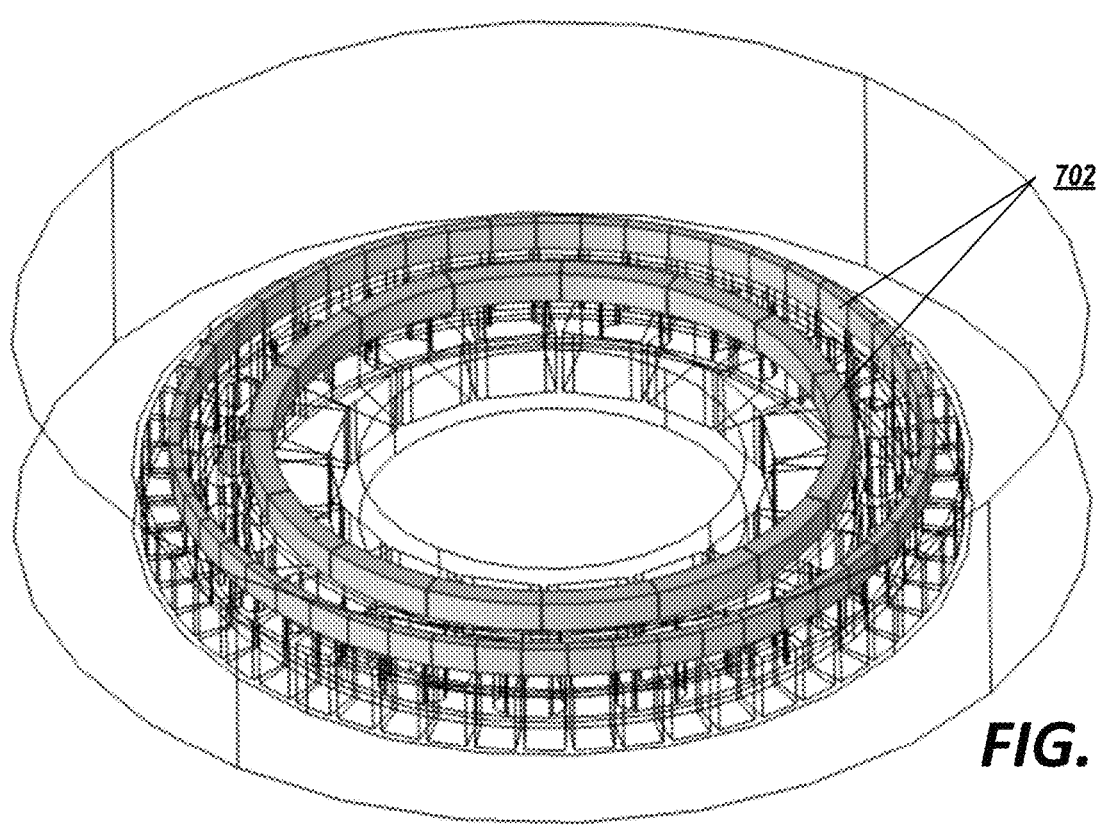

FIGS. 7A and 7B show an example gear machine system configured with Halbach array cladding magnets (shown as 702) in accordance with an illustrative embodiment.

Table 3 shows an example configuration for the gear machine system configured with Halbach array cladding magnets and results, using simulations, of the performance of the axial-end non-Halbach array magnets.

TABLE 3

| Characteristic | Metric | English |
|---|---|---|
| Height Ratio | | 50% |
| Depth | 4.57 mm | 0.180 in |
| Tilt | | 49% |
| Adjusted Axial Length | 20.9 mm | 0.823 in |
| Weight | 1.135 kg | 2.502 lbm |
| 3D COMSOL Torque | 37.4 N * m | 27.6 ft * lbf |
| 3D COMSOL Specific Torque | 32.9 N * m/kg | 11.0 ft * lbf/lbm |
| Specific Torque Improvement over baseline model | | 12.4% |

It was observed that the addition of Halbach array cladding magnets provided specific torque improvement of 12.4% over a base design without any axial-end cladding magnets—a specific torque improvement from 29.7 N*m/kg to 32.9 N*m/kg.

In Table 4, the values for the parameters were selected using a parametric sweep. The machine was found to have an optimal depth and tilt around 0.180" (4.57 mm) and 49° respectively. Indeed, the simulation shows that Halbach array cladding magnets design have the potential to generate significant specific torque improvement in gear machine systems.

Cladding Magnet Example #2

Figure 8:
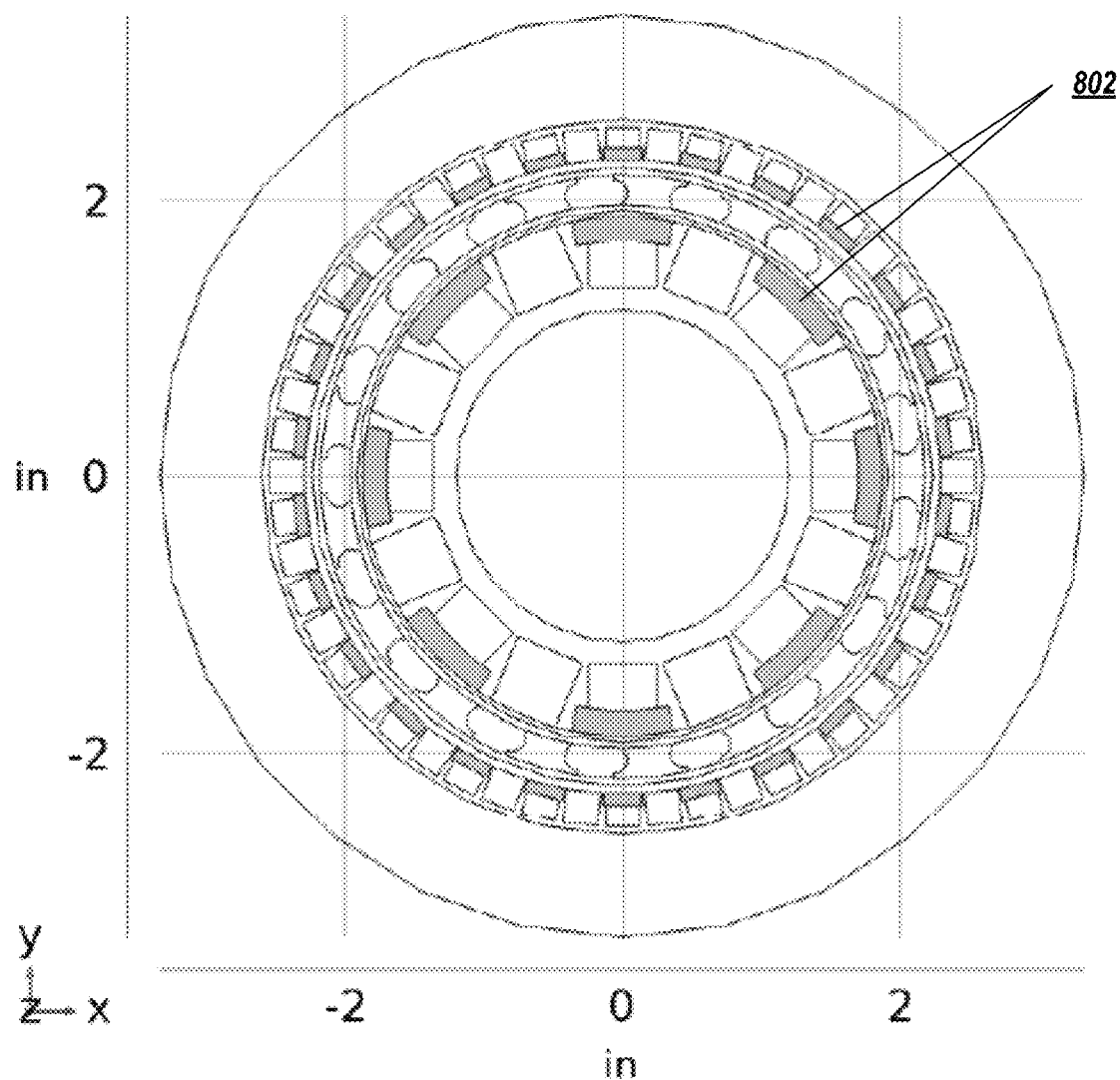
FIG. 8 shows a gear machine system configured with non-Halbach cladding magnets in accordance with an illustrative embodiment.

FIG. 8 shows a gear machine system configured with non-Halbach cladding magnets 802 in accordance with an illustrative embodiment. In FIG. 8, each of non-Halbach cladding magnets 802 are centered on a radially magnetized magnet underneath. The cladding magnets do not utilize a tilt angle.

When Halbach arrays are used for the cladding magnets, the span angle of each cladding magnet is defined by the span angle of the standard gear magnet underneath. Without this definition, a variable had to be used to determine the span angle of each cladding magnet. The variable was labeled span angle ratio phi$_{ratio}$ and behaved according to Equation 6.

$$\phi_{ratio} = \frac{\phi_{CM,in}}{\phi_{P,in}} = \frac{\phi_{CM,out}}{\phi_{P,out}} \quad \text{(Equation 6)}$$

In Equation 6, $\phi_{CM,in}$ is the span angle of a single inner rotor cladding magnet, $\phi_{P,in}$ is the span angle of a single inner rotor pole, $\phi_{CM,out}$ is the span angle of a single outer rotor cladding magnet, and $\phi_{P,out}$ is the span angle of a single outer rotor pole. FIG. 8 shows the non-Halbach cladding magnets having a span angle ratio of 50% where each cladding magnet covers half of each standard gear pole. Each standard gear rotor uses Halbach arrays with 4 magnets per pole-pair.

Table 4 shows an example configuration for the gear machine system configured with non-Halbach cladding magnets 802 and results, using simulations, of the performance of the axial-end non-Halbach array magnets. It was observed that the addition of non-Halbach cladding magnets provided specific torque improvement of 1.37% over a base design without any axial-end cladding magnets.

TABLE 4

| Characteristic | Metric | English |
|---|---|---|
| Span Angle Ratio | 50% | |
| Height Ratio | 33% | |
| Depth | 6.99 mm | 0.275 in |
| Adjusted Axial Length | 23.0 mm | 0.904 in |
| Weight | 1.135 kg | 2.502 lbm |
| 3D COMSOL Torque | 33.8 N * m | 24.6 ft * lbf |
| 3D COMSOL Specific Torque | 29.7 N * m/kg | 9.83 ft * lbf/lbm |
| Specific Torque Improvement over baseline model | 1.37% | |

In Table 4, the values for the span angle ratio, height ratio, and depth were selected using a parametric sweep of the three variables.

Cladding Magnet Example #3

Figure 9:
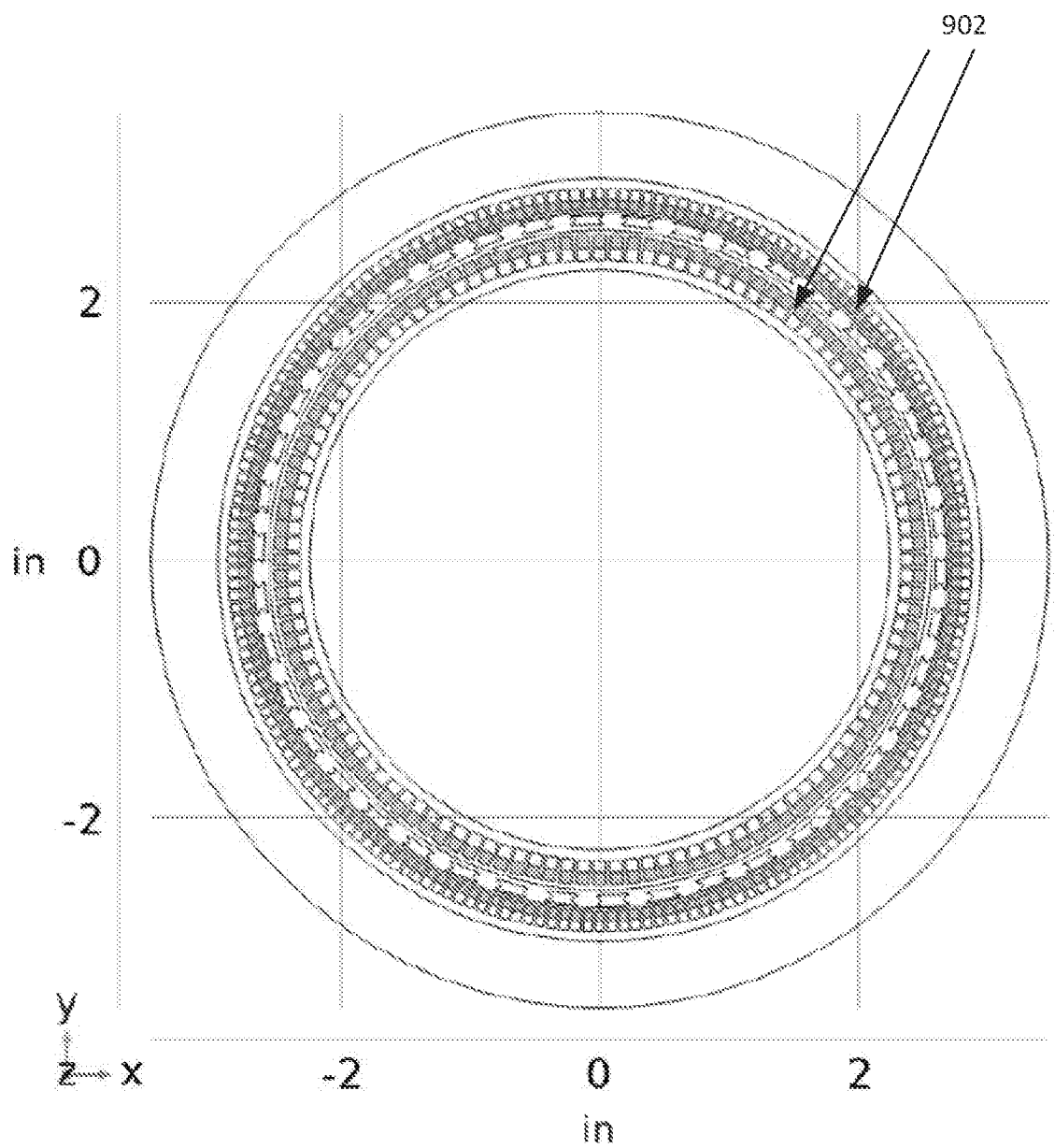
FIG. 9 shows a gear machine system configured with Halbach array cladding magnets in accordance with another illustrative embodiment.

FIG. 9 shows a gear machine system configured with Halbach array cladding magnets 902 in accordance with another illustrative embodiment. This design is optimized for mass and torque output and may be suitable for space, aircraft or rotorcraft applications.

Table 5 shows an example configuration for the gear machine system and simulated performance characteristics.

TABLE 5

| Characteristic | Metric | English |
|---|---|---|
| Gear Ratio | 4.2 | |
| Inner Pole-Pairs | 10 | |
| Outer Pole-Pairs | 32 | |
| Modulator Pieces | 42 | |
| Magnets per Inner Pole-Pair | 12 | |
| Magnets per Outer Pole-Pair | 6 | |
| Outer Radius | 73.0 mm | 2.87 in |
| Outer Magnet Thickness | 4.0 mm | 0.157 in |
| Outer Air Gap Thickness | 1.0 mm | 0.0394 in |
| Modulator Thickness | 2.0 mm | 0.0787 in |
| Inner Air Gap Thickness | 1.5 mm | 0.0591 in |
| Inner Magnet Thickness | 5.0 mm | 0.197 in |
| Axial Length | 15 mm | 0.591 in |
| Weight | 0.379 kg | 0.834 lbm |
| 3D COMSOL Specific Torque | 73.8 N * m/kg | 24.7 ft * lbf/lbm |
| 3D COMSOL Torque | 27.9 N * m | 20.6 ft * lbf |
| 2D COMSOL Torque | 42.4 N * m | 31.3 ft * lbf |
| End-Effect Factor | 65.9% | |

In Table 5, it can be observed that the end-effect factor of 65.9% is still relatively low, being only slightly higher than example of FIG. 8 with an end-effect factor of 62.8%. A low end-effect factor means that a relatively large amount of magnetic flux is being lost to end effects, so the implementation of cladding magnets has the potential to redirect a relatively large amount of flux. This low end-effect factor is likely due to short axial length. The weight shown in Table 5 effectively includes only magnetically active materials.

Table 6 shows an example configuration for the gear machine system configured with Halbach array cladding magnets 902 and experimental results, using simulations, of the performance of the axial-end Halbach array cladding magnets.

TABLE 6

| Characteristic | Metric | English |
|---|---|---|
| Height Ratio | 50% | |
| Depth | 2.35 mm | 0.0925 in |

TABLE 6-continued

| Characteristic | Metric | English |
|---|---|---|
| Tilt | 47.5° | |
| Adjusted Axial Length | 13.0 mm | 0.512 in |
| Weight | 0.379 kg | 0.834 lbm |
| 3D COMSOL Torque | 30.7 N * m | 22.6 ft * lbf |
| 3D COMSOL Specific Torque | 81.0 N * m/kg | 27.1 ft * lbf/lbm |
| Specific Torque Improvement over baseline model | 9.76% | |

From Table 6, it can be observed that the axial-end Halbach array cladding magnets increase the specific torque by 9.76% as compared to the base system described in Table 5.

The data of Table 6 was derived from a study conducted to assess the optimal cladding magnet geometry for specific torque production.

To make the model more representative of a practical magnetic gear, the cladding magnets were sized such that they had the same tangential gap between them as the standard gear magnets. The gap slightly decreases magnitude of the flux density waveform, but it is needed to reinforce the magnets with structural material. The gap could make the waveform more sinusoidal in some embodiments.

Because height ratio and tilt are well understood design variables, the study focused on determining the optimal depth. In the study, a height ratio of 50% was used to completely cover the north or south pole adjacent to the air gap. Tilt was simulated at 45:0°, 47:5°, and 50:0° with very little effect on output torque (<0.01 N*m).

Figure 10:
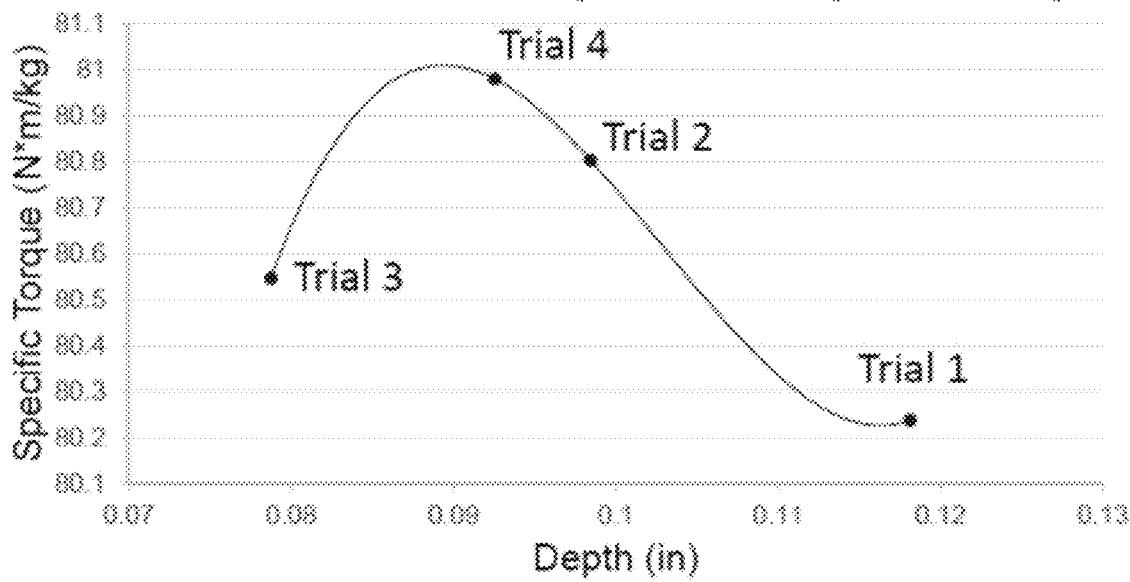
FIG. 10 shows the computer modeling results from the conducted study of the gear system of FIGS. 7A, 8, and 9 in accordance with an illustrative embodiment.

FIG. 10 shows the computer simulation results from the conducted study of the gear system of FIGS. 7A, 8, and 9 in accordance with an illustrative embodiment. Depth for Trial 1 was chosen by applying a linear scaling to the optimal depth of the system of FIG. 8. Iteration 2 was performed based on the ratio of axial length between the systems of FIG. 7A and FIG. 9. optimal value determined from the study was 0.0925" (2.35 mm), which suggest that the optimal depth scaling may have some correlation to the axial length. The optimal depth for the system of FIG. 9 was determined around 0.09" (2.29 mm).

Indeed, the study concludes that cladding magnet retrofitting, and design, can be particularly useful for CMG designs that suffer from extreme end-effect losses. Significant end-effect losses are commonly associated with magnetic gears that have large radii and small axial lengths. This style of CMG is appealing from a scaling perspective because output torque roughly scales as the outer radius squared, which may not apply for design variables like axial length or pole-pair scaling factor. However, increasing outer radius is also shown to increase the significance of end effects. These scaling trends make small axial length, large outer radius, magnetic gears an appealing target for CM-CMG conversion.

It can be observed that the end-effect factor can be sensitive to axial length at relatively small lengths but eventually becomes less sensitive as additions to axial length beyond a certain point do little to change the significance of end-effect losses. Decreasing outer radius and increasing pole-pair scaling factor were found to be correlated with an increasing end-effect factor because the increase of in-plane flux leakage means that axial leakage is less significant. It has been observed that magnetic air gap thickness can have a relatively weak correlation to the end-effect factor.

Discussion

There are many advantages to magnetic gears. Magnetic gears do not require component lubrication. They have the potential to be quieter than mechanical gears. They have inherent overload protection. They have the potential to be directly incorporated into motors/generators which eliminates the need for a gearbox. All of these advantages come with no sacrifice to specific torque output as magnetic gears have comparable specific torque output to mechanical gears.

The exemplary cladding magnets increase the torque output potential for certain designs of magnetic gears which suffer especially severe end-effect losses (small axial length, large radius), but which scale well with respect to torque (magnetic gear torque roughly scales as the radius squared).

Figure 11:
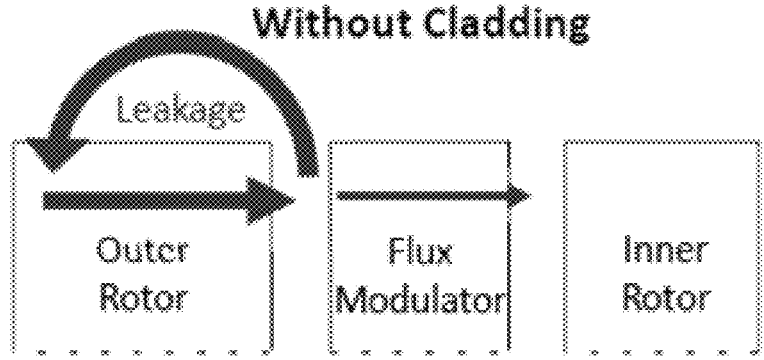
FIG. 11 is a diagram showing magnetic flux leakage at the axial-end of the machine that can contribute to end-effect losses.
Figure 11:
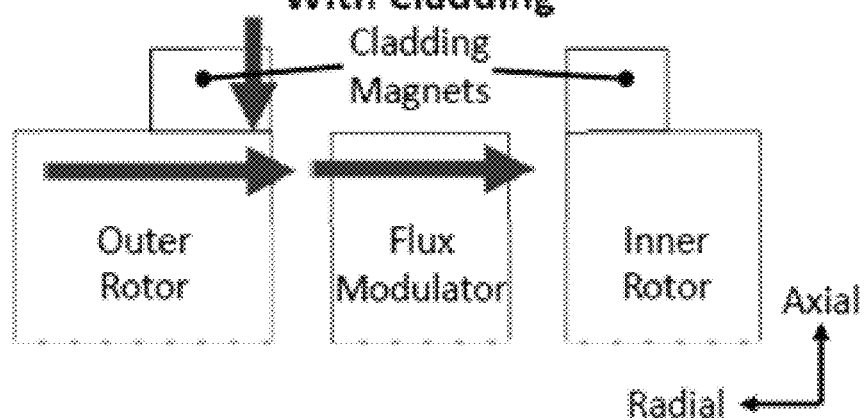

FIG. 11 is a diagram showing magnetic leakage at the axial-end of the machine that can contribute to end-effect losses. The axial-end Halbach array cladding magnets as discussed herein can generate remanent flux density vector in the axial direction that oppose the axial leakage. In FIG. 11, the arrows generally show the flux path among the outer rotor magnets, the flux modulators, and the inner rotor magnets.

In some embodiments, an exemplary magnetic gear system configured with an axial-end Halbach cladding-magnet array is used for gearing for spacecraft system. Magnetic gears do not generally use lubrication making it suitable in zero gravity application.

In some embodiments, an exemplary magnetic gear system configured with an axial-end Halbach cladding-magnet array is used for gearing for short-range, electric aircraft propellers. Such aircraft are often limited by noise requirements, and magnetic gearing could be useful to reduce noise output of aircraft or rotorcraft, e.g., city air taxis usage.

In some embodiments, the exemplary magnetic gear system configured with an axial-end Halbach cladding-magnet array is configured for used for gearing for "hard to reach" places. This is particularly useful where longer operational time and reduced maintenance requirements is desired. Examples of such applications include offshore drilling rigs, large wind turbines, etc.).

In some embodiments, the exemplary magnetic gear system configured with an axial-end Halbach cladding-magnet array is configured for used in small motors, e.g., in automotive vehicles.

Other design variables may be optimized for the exemplary gear machine system configured with the Halbach array cladding magnets, including, for example, but not limited to gear ratio, flux modulator thickness, magnet rotor thickness to the end-effect factor, and rotor and air gap thickness. In some embodiments, multi-dimensional analysis may be performed to relate design variables to the end-effect factor within a single equation. Accurate prediction of the end-effect factor could be used to estimate the extent to which a magnetic gear could benefit from cladding addition.

The Halbach array cladding magnets may be configured on various gear systems, such as coaxial magnetic gears. An additional example of a coaxial magnetic gear is described in Z. Deng, I. Nas and M. J. Dapino, "Torque Analysis in Coaxial Magnetic Gears Considering Nonlinear Magnetic Properties and Spatial Harmonics," in IEEE Transactions on Magnetics, vol. 55, no. 2, pp. 1-11, February 2019, Art no. 8200511, which is incorporated by reference herein in its entirety.

It has been established that end-effect loss plays a significant role in the behavior and performance of magnetic gears, often causing sizable decreases in output torque. Cladding magnets can mitigate these end-effect losses to increase specific torque. Generally speaking, magnetic cladding involves tailoring the magnetization vector of a permanent magnet such that it opposes unwanted leakage. Opposing leakage is relevant to magnetic gears because unwanted leakage over the axial end of the gear can reduce output torque by anywhere from 10% to 40% depending on the design. Opposition to the axial leakage would require permanent magnets on the axial ends of the gear that have a remanent flux density vector in the axial direction.

Magnetic cladding had been proposed for application using a Halbach cylinder as early as 1987, but Halbach arrays have not been evaluated or used to address end effects at the axial end of the machines. Halbach cylinders may improve specific torque for magnetic gears because increased magnetic flux density is related to increased torque, and because the magnet rotors are, in some respects, Halbach cylinders. However, the general application of cladding to Halbach cylinders does not explain how to best apply the concept to magnetic gears. The use of multiple pole-pairs per cylinder, the optimization of flux density at the flux modulator as opposed to the mean flux density of the bore, the inversion of the Halbach cylinder used for the inner rotor, and many other differences add complexity to the problem of magnetic gearing applications. It should be appreciated that any of the components or modules referred to with regards to any of the present embodiments discussed herein, may be integrally or separately formed with one another.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the nth 10 reference in the list. All references cited and discussed in this specification are incorporated herein by reference in their entireties and to the same extent as if each reference was individually incorporated by reference.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g. 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

What is claimed is:

1. A magnetically-geared machine configured as a magnetic gear or magnetically-geared motor comprising a magnetic outer rotor, a magnetic inner rotor, and a flux modulator, the magnetically geared machine further comprising:
    Halbach array cladding magnets disposed at one or both axial ends of the magnetically geared machine, wherein the Halbach array cladding magnets comprise permanent magnetic materials that have a magnetization vector with a non-zero axial component.

2. The magnetically geared machine of claim 1, wherein the axially-oriented Halbach arrays are disposed over each rotor pole to cap magnetic flux at the ends of the electric machine.

3. The magnetically geared machine of claim 1, wherein the axially-oriented Halbach arrays include a plurality of axially directed magnets each positioned over a pole of the magnetic inner rotor and magnetic outer rotor.

4. The magnetically geared machine of claim 1, wherein the magnetic outer rotor, the magnetic inner rotor are configured as a first Halbach array configuration, and wherein the Halbach array cladding magnets are configured as a second Halbach array configuration, wherein each of the magnets of the second Halbach array configuration is magnetized at a tilt angle between about 40° and about 50° to corresponding magnets of first Halbach array configuration.

5. The magnetically geared machine of claim 4, wherein the tilt angle is about 45°.

6. The magnetically geared machine of claim 1, wherein the magnetically geared machine is configured as a small-aspect ratio electric machine.

7. The magnetically geared machine of claim 1, wherein the magnetically geared machine is configured as a magnetic gear.

8. The magnetically geared machine of claim 1, wherein the magnetically geared machine is configured as a coaxial magnetic gear.

9. The magnetically geared machine of claim 1, wherein a percentage of inner/outer rotor magnet height covered by the cladding magnet in the radial direction is at least 50%.

10. An aircraft comprising the magnetically geared machine of claim 1.

11. A wind turbine comprising the magnetically geared machine of claim 1.

12. A vehicle comprising the magnetically geared machine of claim 1.

13. A spacecraft comprising the magnetically geared machine of claim 1.

14. A system comprising:
    magnetically-geared machine configured as a magnetic gear or magnetically-geared motor comprising a magnetic outer rotor, a magnetic inner rotor, and a flux modulator; and
    Halbach array cladding magnets disposed at one or both axial ends of the magnetically geared machine, wherein the Halbach array cladding magnets comprise permanent magnetic materials that have a magnetization vector with a non-zero axial component, and wherein the axially-oriented Halbach arrays are disposed over each rotor pole to cap magnetic flux at the ends of the electric machine.

15. The system of claim 14, wherein the axially-oriented Halbach arrays include a plurality of axially directed magnets each positioned over a pole of the magnetic inner rotor and magnetic outer rotor.

16. The system of claim 15, wherein the magnetic outer rotor, the magnetic inner rotor are configured as a first Halbach array configuration, and wherein the Halbach array cladding magnets are configured as a second Halbach array configuration, wherein each of the magnets of the second Halbach array configuration is magnetized at a tilt angle between about 40° and about 50° to corresponding magnets of first Halbach array configuration.

17. The system of claim 14, wherein the magnetic outer rotor, the magnetic inner rotor are configured as a first Halbach array configuration, and wherein the Halbach array cladding magnets are configured as a second Halbach array configuration, wherein each of the magnets of the second Halbach array configuration is magnetized at a tilt angle between about 40° and about 50° to corresponding magnets of first Halbach array configuration.

18. The system of claim 17, wherein the tilt angle is about 45°.

19. The system of claim 17, wherein the tilt angle is at least one of about 40°, 41°, 42°, 43°, 44°, 45°, 46°, 47°, 48°, 49°, and 50°.

* * * * *